US008536733B2

(12) United States Patent
Lee et al.

(10) Patent No.: US 8,536,733 B2
(45) Date of Patent: Sep. 17, 2013

(54) MASTER AND SLAVE POWER OUTLET SYSTEM

(75) Inventors: Yu-Lung Lee, Miaoli County (TW); Chun-Chuan Chen, Taipei County (TW); Tsung-Chih Lin, Taipei Hsien (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 511 days.

(21) Appl. No.: 12/712,506

(22) Filed: Feb. 25, 2010

(65) Prior Publication Data

US 2011/0080046 A1 Apr. 7, 2011

(30) Foreign Application Priority Data

Oct. 5, 2009 (TW) ................................ 98133663 A

(51) Int. Cl.
*H02J 3/14* (2006.01)
(52) U.S. Cl.
USPC ........................................... 307/39; 307/126
(58) Field of Classification Search
USPC .................................................. 307/39, 126
See application file for complete search history.

(56) References Cited

U.S. PATENT DOCUMENTS

| 7,193,335 | B2 * | 3/2007 | Palmer et al. .................... 307/39 |
| 7,769,857 | B2 * | 8/2010 | Chang et al. .................. 709/224 |
| 8,129,859 | B2 * | 3/2012 | Pien ................................ 307/39 |
| 2009/0150509 | A1 | 6/2009 | Chang et al. |

FOREIGN PATENT DOCUMENTS

| CN | 101459300 B | 9/2010 |
| TW | M291658 U | 6/2006 |
| TW | 200926535 A | 6/2009 |

OTHER PUBLICATIONS

Communication from the Taiwan Patent Office Regarding a Counterpart Foreign Application Dated 101(2012)-10-16.
Communication From the Chinese Patent Office Regarding a Counterpart Foreign Application Dated Apr. 12, 2012.

* cited by examiner

*Primary Examiner* — Hal Kaplan
(74) *Attorney, Agent, or Firm* — Rosenberg, Klein & Lee

(57) ABSTRACT

This invention provides a master and slave power outlet system with a master outlet and a slave outlet, wherein the master outlet includes a current detecting unit and a first wireless module, and the slave outlet includes a second wireless module. When an operating state of a master device connected to the master outlet changes, an output current may change accordingly. The current detecting unit of the master outlet detects the change in the output current and generates a detecting signal, and the master outlet emits a wireless signal through the wireless module according to the detecting signal. The slave outlet receives the wireless signal and provides a power supply or stops providing the power supply to the slave device connected to the slave outlet.

11 Claims, 5 Drawing Sheets

MASTER AND SLAVE POWER OUTLET SYSTEM

BACKGROUND OF THE INVENTION

1. Field of the Invention

The present invention relates to an outlet. In particular, the present invention relates to a master and slave power outlet system.

2. Description of Related Art

FIG. 1 is a schematic diagram of a traditional outlet system.

The traditional power outlet, power strip or the surge protective outlet is independently implemented in separated power outlet system such as the power outlet system 1. The traditional power outlet generally is equipped with a socket 12 or a switch 11. As shown in FIG. 1, the power outlet system 1 connects to a power cord 14 and a plug 13 so as to establish an electrical connection with a power system (not shown) for receiving a power supply. The socket 12 includes a plurality of sub-sockets 121, 122, 123 and 124, and the switch 11 includes a plurality of sub-switches 111, 112, 113 and 114. The sub-switches 111, 112, 113, and 114 may correspond to their respective sub-sockets 121, 122, 123, and 124, respectively. And the sub-switches 111, 112, 113, and 114 are configured to control the switch between "on" and "off" of their corresponding sub-switches 121, 122, 123, and 124. Under this arrangement, electronic equipments such as a computer 15, a stereo system 16, a display screen 17 and a printer device 18 may connect to their corresponding sub-sockets 123, 122, 121 and 124 via a plug 13 and a power line. Therefore, the sub-switches 111, 112, 113, and 114 could be utilized to turn on and off the electronic equipments.

Since the sub-sockets 121, 122, 123 and 124 are usually independently implemented, a manual operation is necessary to turn on and off the multiple electronic equipments at the same time.

SUMMARY OF THE INVENTION

The present invention provides a master and slave power outlet system including a master outlet having a first power output interface for outputting a first power supply to a first master device connected to the first power output interface, a current detecting unit connected to the first power output interface, for generating a detecting signal by detecting an output current of the first power output interface, a first processing unit, connected to the current detecting unit, for receiving the detecting signal before generating a first control signal, a first wireless module, connected to the first processing unit, for receiving the first control signal before emitting a wireless signal, a slave outlet including a second processing unit, and a second power output interface for outputting a second power supply to a slave device connected to the second power output interface, a second wireless module, connected to the second processing unit, for receiving the wireless signal and transmitting the wireless signal to the second processing unit, which generates a second control signal according to the wireless signal, and a second switch, connected to the second processing unit and the second power output interface, for controlling the second power output interface according to the second control signal to provide the second power supply or stop providing the second power supply to the slave device.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 2:
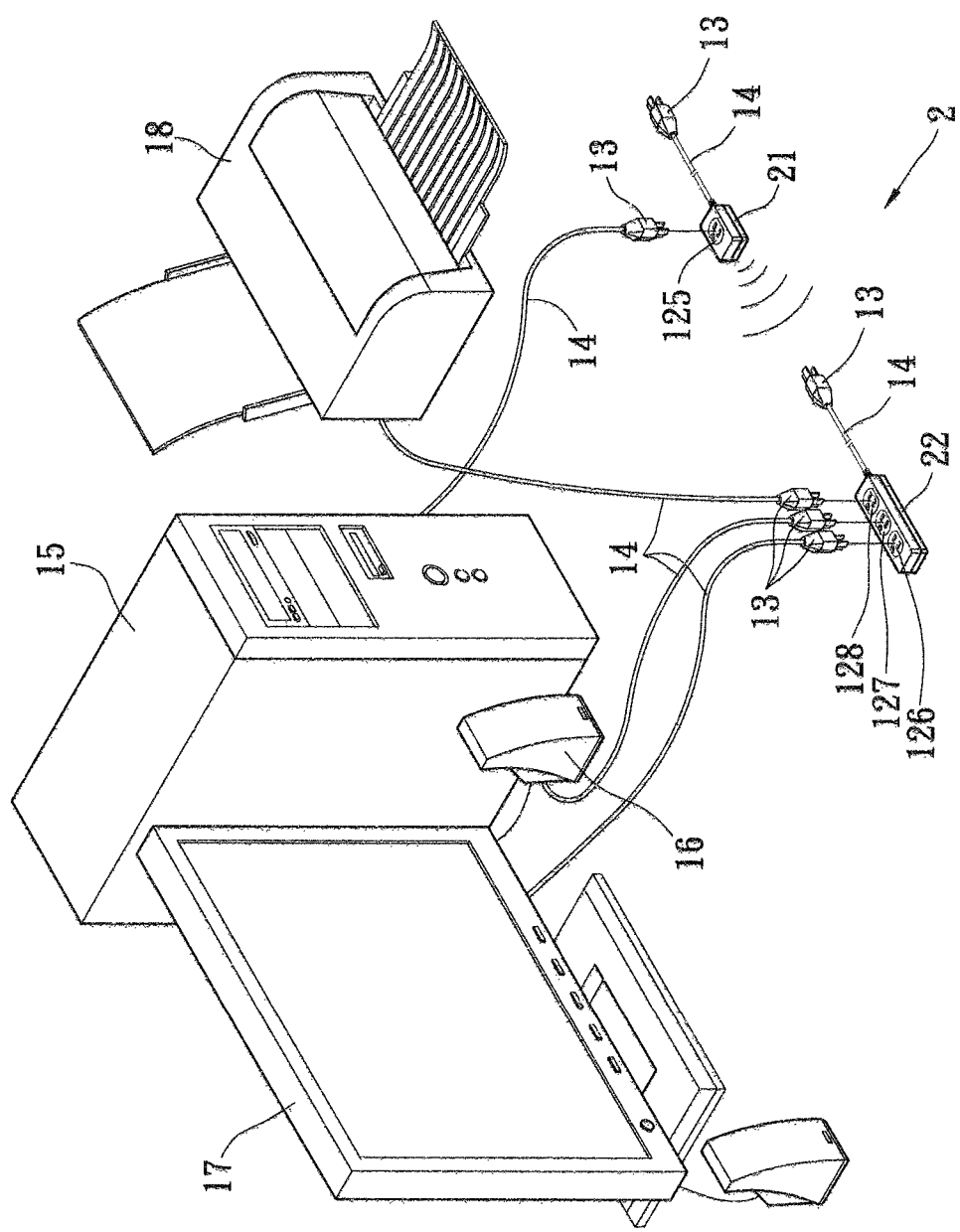
FIG. 2 is a schematic diagram of a master and slave power outlet system in accordance with one embodiment of the present invention.

FIG. 2 is a schematic diagram of a master and slave power outlet system 2 in accordance with one embodiment of the present invention.

Throughout the disclosure, a master device is defined as a device that is capable of proactively delivering the information. On the other hand, a slave device is defined as a device that is capable of receiving the information from the master device. The master and slave power outlet system 2 includes a master outlet 21 and a slave outlet 22. The master outlet 21 has at least one socket 125 that is configured to provide a power supply to the master device (such as a computer 15) through a plug 13 and a power cord 14. The slave outlet 22 has a plurality of sockets 126, 127 and 128 that are configured to provide corresponding power supply to the slave devices such as a stereo system 16, a display screen 17, and a printer device 18, respectively, through the plug 13 and the power cord 14.

The computer 15 may serve as the master device in relative to the stereo system 16, the display screen 17, and the printer device 18 as the slave devices. In other words, when the computer 15 operates it may provide audio information to the stereo system 16, display image information on the display device 17, and print out a word-formatted document through the printer device 18. When a system consists of the computer 15, the stereo system 16, the display device 17, and the printer device 18, without the operation of the computer 15 the stereo system 16, the display device 17, or the printer device 18 may not be able to present any information.

The master and slave power outlet system 2 includes a master outlet 21 for connecting at least one master device and providing power supply with the master device. The master and slave power outlet system 2 further includes a slave outlet 22 for connecting at least one slave device and providing power supply with these slave devices.

The master outlet 21 has current detecting function. When the master outlet 21 detects an output current to the computer 15, which means the computer 15 is in operation, the master outlet 21 may generate a wireless signal in accordance with the detection of the output current. When the slave outlet 22 receives the wireless signal, the sockets 126, 127, 128 may be configured to provide power supply with the stereo system 16, the display device 17, and the printer device 18. Therefore, only the computer 15 needs to be turned on before the slave devices in relative to the computer 15 could be turned on, eliminating the necessity of turning on the slave devices sequentially for the receipt of the information from the master device.

Figure 3:
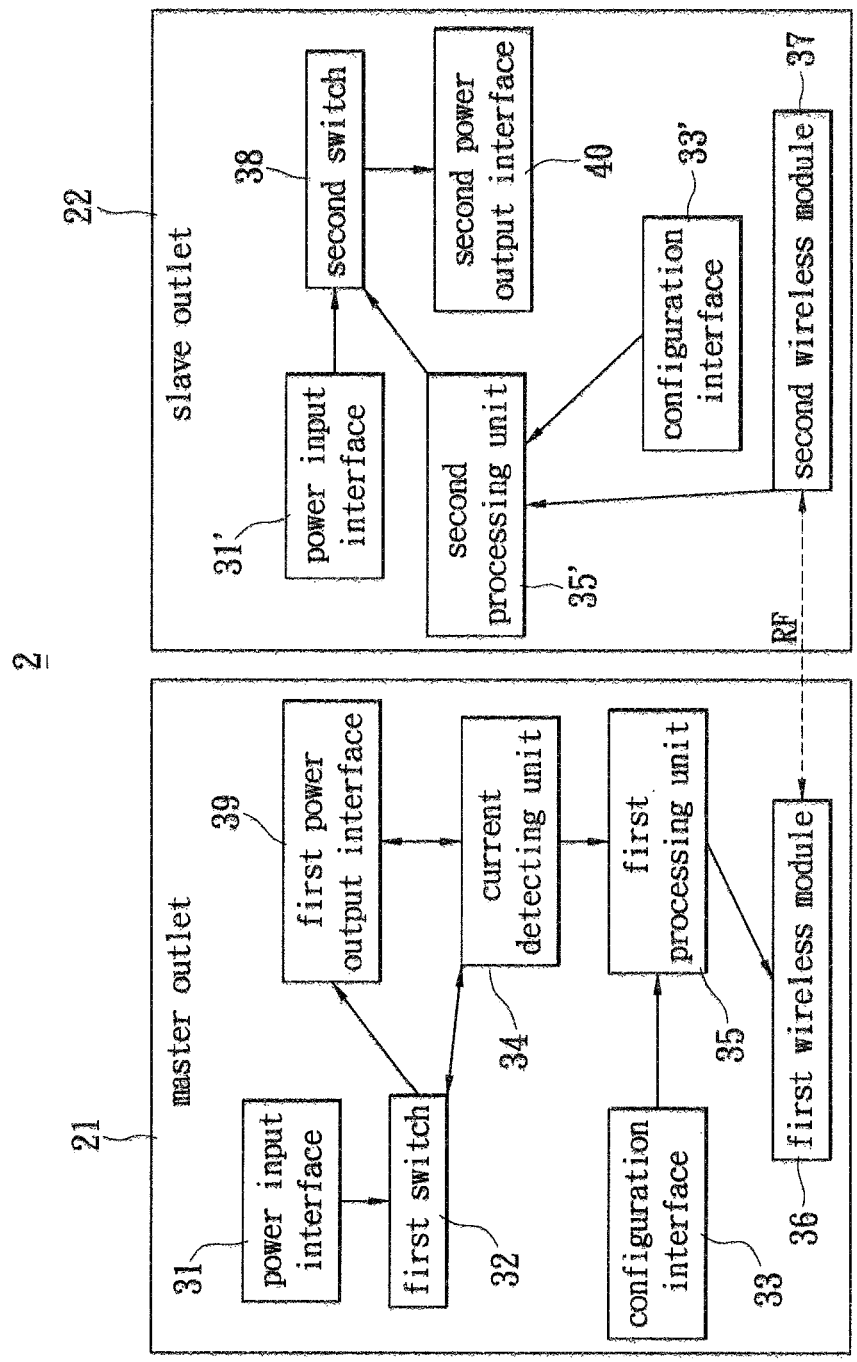
FIG. 3 is a schematic module diagram of the master and slave power outlet system in accordance with one embodiment of the present invention.

FIG. 3 is a schematic module diagram of the master and slave power outlet system in accordance with one embodiment of the present invention.

As shown in FIG. 3, the master and slave power outlet system 2 has a master outlet 21 and a slave outlet 22.

The master outlet 21 has a power input interface 31, a first switch 32 (i.e. master switch), a configuration interface 33, a current detection unit 34, a first processing unit 35, a first wireless module 36, and a first power output interface 39. The slave outlet 22 includes a power input interface 31', a second switch 38 (i.e. slave switch), a configuration interface 33', a second processing unit 35', a second wireless module 37, and a second power output interface 40.

Figure 1:
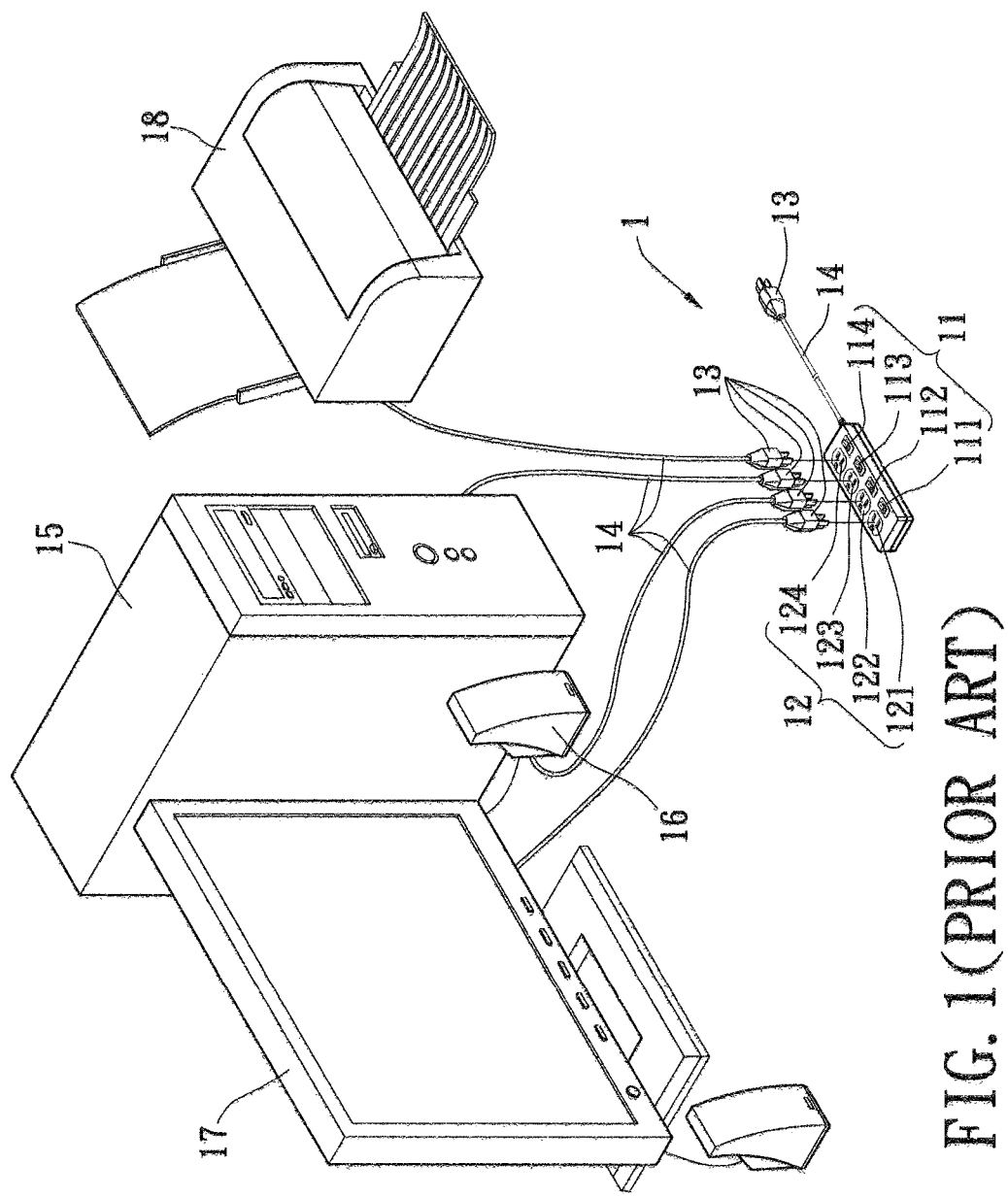
FIG. 1 is a schematic diagram of a traditional power et system.

The power input interfaces 31 and 31' may be implemented as a combination of the power cord 14 and the plug 13 shown in FIG. 1. The power input interfaces 31 and 31' may be configured to receive a power supply from a power supply system (not shown). The first power output interface 39 may be implemented as the socket 125 while the second power output interface 40 may be implemented as the sockets 126, 127, and 128.

The first switch 32 of the master outlet 21 electrically connects to the power input interface 31, the first power output interface 39, and the first processing unit 35. The current detection unit 34 electrically connects to the first power output interface 39 and the first processing unit 35. The configuration interface 33 and the first wireless module 36 electrically connect to and the first processing unit 35. The second switch 38 of the slave outlet 22 electrically connects to the power input interface 31', the second power output interface 40, and the second processing unit 35'. The configuration interface 33' and the second wireless module 37 electrically connect to the second processing unit 35'.

The power input interface 31 receives a power supply from the power supply system and transmits the power supply to the first power output interface 39 through the first switch 32. An output of the power supply from the first power output interface 39 is associated with an output of an output current. A stoppage of the output of the power supply from the first power output interface 39 may correspond to a stoppage of the outputs the output current. The current detecting unit 34 is configured to detect the output of the output current or the stoppage thereof and to generate a detecting signal accordingly. The first processing unit 35 is configured to receive the detecting signal before generating a first control signal in accordance with the detecting signal. The first wireless module 36 is configured to receive the first control signal, and to emit a wireless signal according to the first control signal, wherein the wireless signal is RF signal. F interface 33 is configured to receive a configuration value.

The power input interface 31' receives a power supply from the power supply system and transmits the power supply to the second power output interface 40 through the second switch 38. And, the second wireless module 37 of the slave outlet 22 is configured to receive the wireless signal of the master outlet 21, then send the wireless signal to the second processing unit 35' of the slave outlet 22. The second processing unit 35' is configured to generate a second control signal according to the wireless signal wherein the second control signal is configured to control the switch of "on" and "off" the second switch 38. The "on" and "off" switch dictates the transmission of the power supply received by the power input interface 31' to the second power output interface 40.

Please refers to the FIGS. 2 and 3, the master outlet 21 receives the power supply through a connection between the power input interface 31 and the power system. The power input interface 31 provides the power supply to the computer 15 through the first power output interface 39 connected to the computer 15. The operation of the computer 15 dictates the supply of the output current from the master outlet 21 to the computer 15. The current detecting unit 34 is configured to generate the detecting signal according to the output/supply of the output current. The first processing unit 35 is configured to generate the first control signal according to the detecting signal to the first wireless module 36. The first wireless module 36 is thus configured to transmit the wireless signal to the second wireless module 37 of the slave outlet 22. The second processing unit 35' is configured to generate the second control signal according to the wireless signal to control the on and off of the second switch 38. Thus, the second power output interface 40 may either provide the power supply to the second power output interface 40 or not. Consequently, the slave devices such as stereo system 16, display screen 17, and printer device 18 which connected to the slave outlet 22 may receive the power supply before being turned on or receive no power supply before being shut down.

The master outlet 21 is configured to detect whether the master device is in operation or not. When the master device is in operation, the master outlet 21 may provide the power supply, which is associated with the output of the output current to the master device. On the other hand, when the master device is not in operation, no power supply is provided to the master device and thus no output of the output current to the master device. The current detecting unit 34 is configured to detect the output of the output current before the master outlet 21 could generate the wireless signal indicative of whether there is any output current or not. The slave outlet 22 is configured to receive the wireless signal so as to turn on or shut down the second switch 38. It is worth noting that the on and off of the second switch 38 dictates the power supply to the slave devices connected to the slave outlet 22.

In short, when the master device connected to the master outlet 21 is in operation power supply from the slave outlet 22 could be provided to slave devices connected to the slave outlet 22. As such, the slave devices could be in operation as well. When the master device connected to the master outlet 21 is not in operation, no power supply would be provided to the slave outlet 22. Therefore, the slave devices connected to the slave outlet 22 may be no longer in operation. Thus, a master-slave relationship between the socket 125 of the master outlet 21 and the sockets 126, 127, and 128 of the slave outlet 22 may be established.

Further, the master outlet 21 and slave outlet 22 include configuration interfaces 33 and 33' respectively for configuring the master-slave relationship between the sockets 126, 127, and 128 of the slave outlet 22 and the socket 125. It is worth noting that the master-slave relationship may be between any of the sockets 126, 127, and 128 and the socket 125. It is also worth noting that the master outlet 21 may include more than one socket and more than one power output interface and the slave outlet 22 may include more than one power output interface. And the master-slave relationship between the sockets and the multiple power output interfaces of the same outlet may be established by the configuration interfaces 33 and 33'.

The first wireless module 36 and the second wireless module 37 may include a transceiver and a receiver. As such, the slave outlet 22 could receive the wireless signal from the master outlet indicative of whether the master device connected to the master outlet is in operation. Furthermore, the slave outlet 22 may transmit another wireless signal to the master outlet to deliver the information including power supply status or on/off state of the slave outlet.

Figure 4:
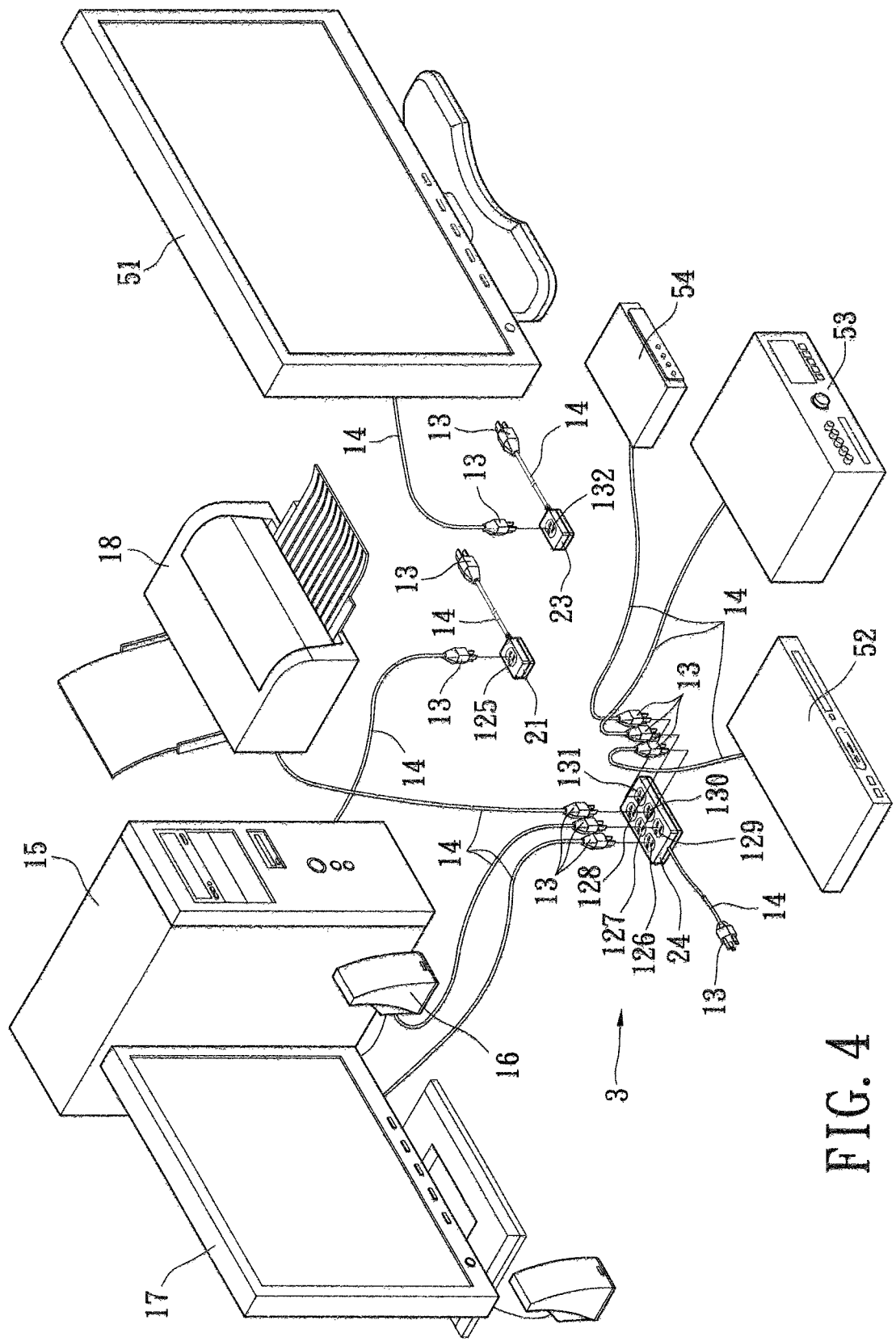
FIG. 4 is a schematic device diagram of the master and slave power outlet system in accordance with one embodiment of the present invention.

FIG. 4 is a schematic device diagram of the master and slave power outlet system in accordance with one embodiment of the present invention.

The master and slave power outlet system 3 includes a plurality of master outlets 21 and 23 and at least one slave outlet 24. The master outlets 21 and 23 could be the examples of the master outlet 21 shown in FIG. 3. And the slave outlet 24 could be the example of the slave outlet 22 in FIG. 3. The slave outlet 24 has at least two sets of sockets 126, 127, and 128 and 129, 130, and 131. The first set of sockets 126, 127, and 128 of the slave outlet 24 correspond to the master outlet 21 and could be configured to have the master-slave relationship in relative to the master outlet 21. And the second set of sockets 129, 130, and 131 of the slave outlet 24 may correspond to the master outlet 23 and could be configured to have the master-slave relationship in relative to the master outlet 23. The first power output interface 39 may be implemented as the socket 125 while the second power output interface 40 may be implemented as the socket 126,127,128. Similarly, the third power output interface 41 may be implemented as the socket 132 while the fourth power output interface 42 may be implemented as the socket 129, 130, 131.

When the computer 15 connected to the master outlet 21 is in operation the master outlet 21 may detect the output of the output current associated with the operation of the computer 15 and thus generate the wireless signal in order to turn on the first set of the sockets 126, 127, and 128. Therefore, the stereo system 16, the display device 17, and the printer device 18 could be put in operation as well. Similarly, the stereo system 16, the display device 17, and the printer device 18 may not be in operation when the computer 15 is not in operation. Meanwhile, the master outlet 23 may be coupled to a television 51 while the second set of the sockets 129, 130, and 131 of the slave outlet 24 that correspond to the master outlet 23 may be coupled to a digital versatile disc (DVD) player 52, a stereo system 53, and a set-top box (STB) 54. Since the second set of the sockets 129, 130, and 131 and the master outlet 23 could be in their respective master-slave relationship, the operation state of the television 51 may dictate the operation of the DVD player 52, the audio system 53 and the STB 54. In order to do so, the master outlet 23 may detect whether there is any output of the output current of the television 51 before the on and off of the second set of the sockets could be controlled.

Figure 5:
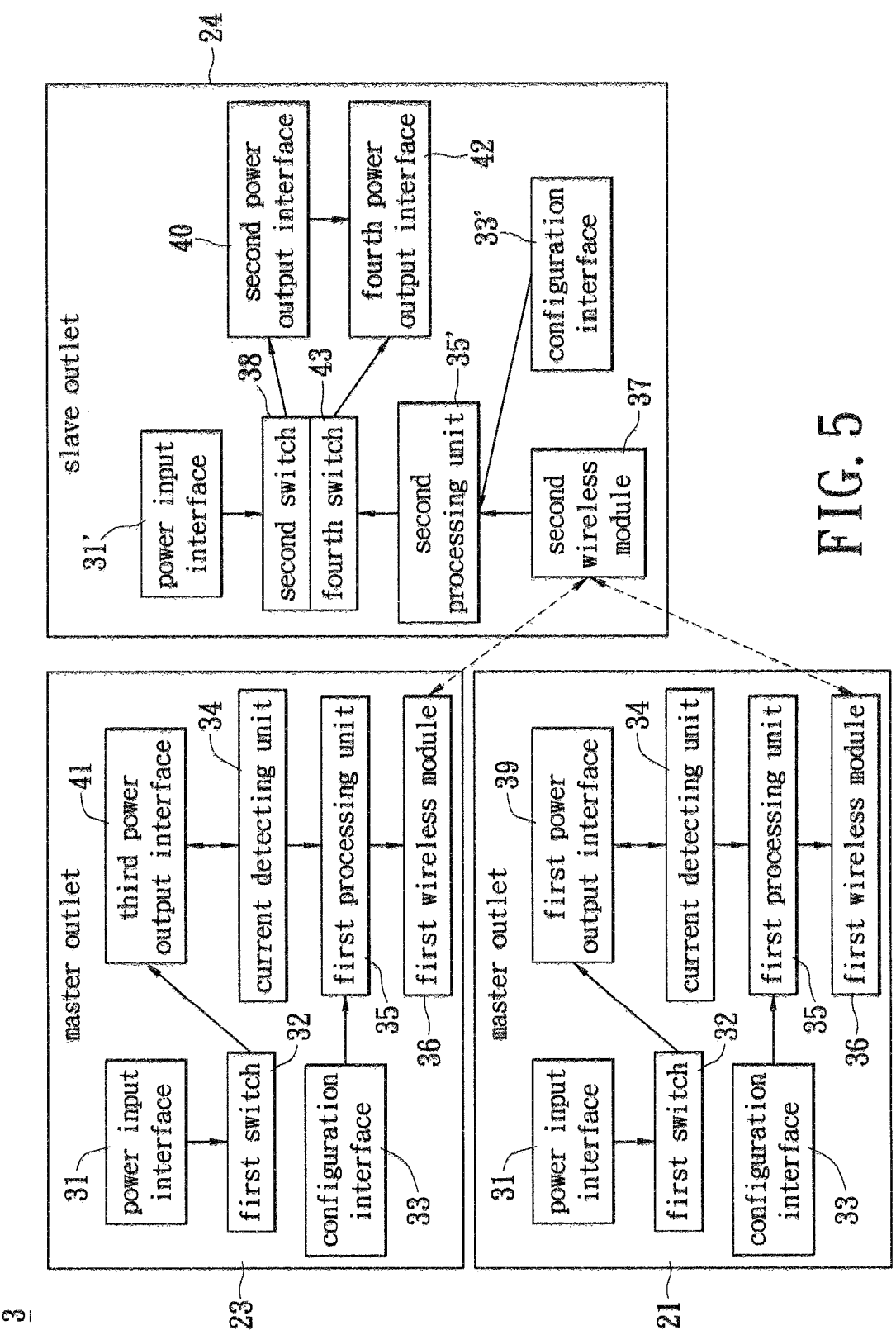
FIG. 5 is a schematic system module diagram of the master and slave power outlet system in accordance with one embodiment of the present invention.

FIG. 5 is a schematic system module diagram of the master and slave power outlet system in accordance with one embodiment of the present invention.

The master and slave power outlet system 3 includes a plurality of master outlets 21 and 23 and at least one slave outlet 24. The master outlets 21 and 23 could be the examples of the master outlet 21 shown in FIG. 3. And the slave outlet 24 could be the example of the slave outlet 22 in FIG. 3. The slave outlet 24 has at least two sets of sockets 126, 127, and 128 and 129, 130, and 131. The first set of sockets 126, 127, and 128 of the slave outlet 24 correspond to the master outlet 21 and could be configured to have the master-slave relationship in relative to the master outlet 21. And the second set of sockets 129, 130, and 131 of the slave outlet 24 may correspond to the master outlet 23 and could be configured to have the master-slave relationship in relative to the master outlet 23.

The master and slave power outlet system 3 includes a plurality of master outlets 21 and 23 and at least one slave outlet 24. The master outlets 21 and 23 could be the examples of the master outlet 21 shown in FIG. 3. And the slave outlet 24 could be the example of the slave outlet 22 in FIG. 3. The slave outlet 24 further includes a fourth switch 43 and a fourth power output interface 42. The fourth switch 43 is configured to be electrically connected to the power input interface 31', the second processing unit 35' and the fourth power output interface 42.

Please refer to FIG. 4 and FIG. 5. When the computer 15 is in operation, the first power output interface 39 of the master outlet 21 may generate the output current for the operation of the computer 15. The current detecting unit 34 is configured to detect the output current before generating the detecting signal. And the first processing unit 35 is configured to generate the first control signal to enable the first wireless module 36 to transmit the wireless signal according to the detecting signal. The slave outlet 24 receives the wireless signal via the second wireless module 37. The second processing unit 35' is configured to generate the second control signal according to the received wireless signal in order to turn on the second switch 38. Therefore, the power supply received by the power input interface 31' could be delivered to the second power output interface 40 so that the stereo system 16, the display device 17, and the printer device 18 could be put in operation as well.

Similarly, when the computer 15 is not in operation the stereo system 16, the display device 17, and the printer device 18 may not be put in operation by following the similar process mentioned in the previous paragraph.

In short, the master sockets 21 and 23 are configured to detect the operating state (i.e., "on" and "off") of the master device. When the master device is "on," the output current may be generated. That output current may be detected by the current detecting units of the master sockets 21 and 23 before the wireless signals from the master sockets are generated. The slave socket 24 is configured to receive the wireless signals to turn on the second switch 38 and the fourth switch 43. As such, the slave devices coupled to the second switch 38 and the fourth switch 43 could be turned on as well. When the master device is "off," no output current may be generated nor detected. Another wireless signal may be generated accordingly to indicate the absence of the output current. And thus the second switch 38 and the fourth switch 43 may be turned off and the slave device coupled to the second switch 38 and the fourth switch 43 may not be put in operation.

Depending on the operating state of the master devices coupled to the corresponding master sockets 21 and 23, the operating state of the slave devices coupled to the slave socket 22 may be changed since the operating state of the master devices may dictate delivery of the power supply to the second power output interface 40 and the fourth power output interface 42. The delivery of the power supply to the power output interfaces 40 and 42 of the master outlets 21 and 23 may further dictate the power supply to the second power output interface 40 and the fourth power output interface 42 of the slave outlet 22.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A master and slave power outlet system, comprising:
a master outlet including:

a first power output interface for outputting a first power supply to a first master device connected to the first power output interface;
a current detecting unit connected to the first power output interface for generating a detecting signal according to whether an output current associated with the first power supply is detected;
a first processing unit connected to the current detecting unit for receiving the detecting signal in order to generate a first control signal;
a first wireless module connected to the first processing unit for receiving the first control signal before generating a wireless signal;
a slave outlet including:
a second processing unit;
a second power output interface for outputting a second power supply to a slave device connected to the second power output interface;
a second wireless module connected to the second processing unit for receiving the wireless signal and transmitting the wireless signal to the second processing unit so that the second processing unit generates a second control signal; and
a slave switch, connected to the second processing unit and the second power output interface, for controlling the second power output interface according to the second control signal to determine whether to provide the second power supply to the slave device.

2. The master and slave power outlet system as claimed in claim 1, wherein the master outlet further comprises a power input interface connected to a power system via a power cord and a plug to receive the first power supply.

3. The master and slave power outlet system as claimed in claim 2, wherein the master outlet further comprises a master switch connected to the first power output interface, the power input interface, and the first processing unit.

4. The master and slave power outlet system as claimed in claim 1, wherein the second power output interface corresponds to a plurality of sockets.

5. The master and slave power outlet system as claimed in claim 4, wherein the master outlet further comprises a configuration interface for configuring a master-slave relationship between the first power output interface of the master outlet and at least one of the sockets of the slave outlet.

6. A method for controlling an operation of a slave device coupled to a slave outlet in a master and slave power outlet system having a master outlet, comprising:
providing the master outlet, electrically connected to a master device, for generating an output current or stopping the output current from being generated according to an operating state of the master device, and generating a wireless signal according to the output current; and
providing the slave outlet, electrically connected to the slave device, for receiving the wireless signal, and outputting a second power supply to the slave device according to the wireless signal;
wherein the master outlet comprises a first power output interface, a current detecting unit, a first processing unit, and a first wireless module, the first power output interface is used for outputting a first power supply to the master device connected to the first power output interface, the current detecting unit is connected to the first power output interface and used for generating a detecting signal by detecting the output current of the first power output interface, the first processing unit is connected to the current detecting unit and used for receiving the detecting signal before generating a first control signal, the first wireless module is connected to the first processing unit and used for receiving the first control signal before emitting the wireless signal.

7. The controlling method as claimed in claim 6, wherein the slave outlet further comprises:
a second processing unit;
a second power output interface for outputting the second power supply to the slave device connected to the second power output interface;
a second wireless module, connected to the second processing unit, for receiving the wireless signal and transmitting the wireless signal to the second processing unit, wherein the second processing unit is configured to generate a second control signal according to the wireless signal; and
a slave switch, connected to the second processing unit and the second power output interface, for controlling the second power output interface according to the second control signal to provide the second power supply or stop providing the second power supply to the slave device.

8. The controlling method as claimed in claim 6, wherein the master outlet further comprises a power input interface connected to a power system via a power cord and a plug.

9. The controlling method as claimed in claim 8, wherein the master outlet further comprising a master switch connected to the first power output interface, the power input interface and the first processing unit, wherein the master switch controls the power input interface to provide the first power supply or stop providing the first power supply.

10. The controlling method as claimed in claim 7, wherein the second power output interface comprises a plurality of sockets.

11. The controlling method as claimed in claim 10, wherein the master outlet further comprises a configuration interface for setting a master-slave relationship between the first power output interface of the master outlet and at least one of the sockets of the slave outlet.

* * * * *